(12) United States Patent
Froza (10) Patent No.: US 10,455,976 B2
(45) Date of Patent: Oct. 29, 2019

(54) COUPLING SYSTEM OF A REMOVABLE VISOR FOR A PRESSURE COOKER

(71) Applicant: Antonio Froza, Marmeleiro (BR)

(72) Inventor: Antonio Froza, Marmeleiro (BR)

( * ) Notice: Subject to any disclaimer, the term of this patent is extended or adjusted under 35 U.S.C. 154(b) by 450 days.

(21) Appl. No.: 14/278,529

(22) Filed: May 15, 2014

(65) Prior Publication Data
US 2014/0245898 A1  Sep. 4, 2014

Related U.S. Application Data

(63) Continuation-in-part of application No. 13/496,294, filed on Mar. 15, 2012, now abandoned.

(51) Int. Cl.
*A47J 36/16* (2006.01)
*A47J 27/08* (2006.01)
*A47J 27/09* (2006.01)

(52) U.S. Cl.
CPC .............. *A47J 36/16* (2013.01); *A47J 27/08* (2013.01); *A47J 27/09* (2013.01)

(58) Field of Classification Search
CPC . A47J 27/08; A47J 27/09; A47J 36/16; B65B 51/00
USPC ............ 99/337, 341, 645, 646 R; 220/573.1, 220/662, 663, 664
See application file for complete search history.

(56) References Cited

U.S. PATENT DOCUMENTS

| | | | | |
|---|---|---|---|---|
| 2,591,767 A | * | 4/1952 | Andres | A47J 27/08 220/203.09 |
| 2,660,330 A | * | 11/1953 | Keller | A47J 27/0806 220/298 |
| 2,702,046 A | * | 2/1955 | Duskey | A47J 27/09 137/467 |
| 4,122,964 A | * | 10/1978 | Morris | B65D 51/145 215/200 |
| 4,143,787 A | * | 3/1979 | Walker | A47J 27/09 137/467 |
| 4,830,216 A | * | 5/1989 | Miyauchi | A47J 27/08 220/377 |
| 5,687,870 A | * | 11/1997 | Carlile | F16J 13/24 220/316 |
| 6,546,849 B1 | * | 4/2003 | Shimazaki | A47J 36/08 210/465 |
| 7,090,090 B2 | * | 8/2006 | Ohyama | A47J 36/027 220/203.09 |

(Continued)

FOREIGN PATENT DOCUMENTS

| | | | |
|---|---|---|---|
| EP | 2606775 | * | 6/2013 |
| FR | 2975882 | * | 7/2012 |

*Primary Examiner* — Ibrahime A Abraham
*Assistant Examiner* — Frederick F Calvetti
(74) *Attorney, Agent, or Firm* — Bay State IP, LLC (57) ABSTRACT

This utility model belongs to the technological sector of housewares and refers specifically to a coupling system of a visor for a pressure cooker that can be removed for cleaning and safely reassembled by the user without safety risks for the user. In summary, the developed solution consists basically of an elastomer material sleeve and a flat glass part. The arrangement of the parts of the visor coupling system still has the differential of avoiding the user to reverse the visor at the time of reassembly. It also features as a differential the use of grips of the elastomer to dismiss the use of screws, nuts, vulcanization, etc. to couple and seal the visor when performing the tightness of the pressure cooker.

7 Claims, 6 Drawing Sheets

(56) References Cited

U.S. PATENT DOCUMENTS

| | | | | |
|---|---|---|---|---|
| 7,364,357 B2* | 4/2008 | Wu | ...................... | A47J 45/068 |
| | | | | 374/141 |
| 7,637,206 B2* | 12/2009 | Seurat Guiochet | .......................... | |
| | | | | A47J 27/0806 |
| | | | | 219/440 |
| 2012/0193364 A1* | 8/2012 | Zhong | ..................... | A47J 36/10 |
| | | | | 220/573.1 |
| 2013/0098921 A1* | 4/2013 | Yang | ...................... | A47J 36/10 |
| | | | | 220/573.1 |

* cited by examiner

COUPLING SYSTEM OF A REMOVABLE VISOR FOR A PRESSURE COOKER

CROSS REFERENCE TO RELATED APPLICATION

This application is a continuation-in-part and claims the benefit of and takes priority from U.S. patent application Ser. No. 13/496,294 filed on Mar. 15, 2012, which in turn takes priority from and claims the benefit of International Application No. PCT/BR2010/000329 having an international filing date of Sep. 16, 2010, and which in turn claims priority under 35 USC 119 to Brazil Patent Application No. PI0903794-2 filed on Sep. 17, 2009.

BACKGROUND OF THE INVENTION

Field of the Invention

This utility model belongs to the technological sector of domestic and industrial tools and refers specifically to an improvement applied to traditional and electrical pressure cookers equipped with visors on their lids.

Description of the Related Prior art

Pressure cookers are widely used for food cooking because they make this process less expensive and more effective. These tools are provided with lids that seal their interior hermetically, and valves that allow steam to escape, and thus can be used safely.

In general, there are many models of pressure cookers for domestic and industrial use. The commonly known models are pressurized and generally do not have devices that allow the viewing of the food during the cooking process. Thus, at times the cooking process has to be stopped and the pan has to be depressurized to the user check if the cooking is appropriated. In case it is not appropriated, it is necessary to reheat the pan to pressurize it again and resume the cooking process. It is then evident that with the traditional models of pressure cooker it is necessary to spend a reasonable time to check the fluid level and the advancement of the process time, reflecting directly on the cooking process of the food.

Therefore the design of pressure cookers with transparent visors has drawn attention in the household area and there is a race in search of technical solutions for achieving these developments. However, the known proposal do not take into account the dimensional and physical variations—dilatation—of the components when in use. Moreover, it is worth mentioning that these overheated rigid materials are under strong pressure, tension and friction between them.

The European patent EP 0298485 proposes several ways of implementing transparent fixed visors in pressure cookers. That is, these proposed visors are fixed by using metal parts or glued rubbers, bringing risk to its users, because the metals when heated become dilated and may cause cracks and guts between materials and it may cause tension, fatigue and cracks in the glass, resulting in exposure of the physical integrity of the users. Similarly, the Chinese patent CN2464213Y also proposes a way to use a fixed visor in a pressure cooker, but the proposal does not consider the dilations and the stresses of the materials when heated and pressurized, and also does not consider how the seals would be made and how the coupling of the visor with the lid is made, so it is incomplete.

Since these visors are fixed, it is clear the difficulty of access in certain areas of the tool for its proper cleaning. Waste disposal of food and salts impact directly on deteriorating as well as on the emergence of pressure leakage, oxidation and on the emergence of bacteria, reasons that would lead a lay user to attempt to disassemble the visor for cleaning or maintenance. The mistaken reassembly of parts from the pan visor, i.e. if the user accidentally changes the position of some of the parts, may result in a malfunction of the tool or bring potential danger to the user. In general, among the known proposals for pressure cookers equipped with a transparent visor, the ways to facilitate the removal of the visor set for its cleaning were not considered, neither the risks nor the need to avoid its inverted coupling. This demonstrates the fragility of known projects when they are inspected and analyzed in a matter of safety.

In order to provide a viable alternative with total safety and consequently care with the physical integrity of the users, a pressure cooker with a removable visor was developed. As described in the applicant's U.S. patent application Ser. No. 13/496,294 of the same applicant, it is proposed a tool provided with transparent visors on the lid and/or body of the pan. The visor is coupled to the inside of the lid and consists primarily of a part of tempered glass and a part of nontoxic polymeric material (rubber, silicone, etc.) with the aim of proposing a coupling device that can be coupled and removed many times in the hole specially designed for viewing. Thus, in summary, it is proposed a pressure cooker with removable visors. However, it is noteworthy that the embodiments of the coupling sealing material do not have an arrangement that securely meet the fixing of the glass and of the visor itself to the pressure cooker lid.

Based on the above it is clear the impossibility to use these fixed visors in pressure cookers without any risk to the end user.

SUMMARY OF THE INVENTION

In order to eliminate the drawbacks present in the prior art, this utility model proposes an improvement in a coupling system of a removable visor for pressure cookers that enables maintenance or cleaning by the user with appropriate safety since it has a system for a practical mounting of the visor in the pressure cooker lid.

The arrangement of the parts of the coupling system in question still has the differential of preventing the user to reverse the visor when reassembling it. With this, it is stated to be a safe system since the use of a visor for pressure cookers aims to benefit users by reducing time and costs in food preparation. From the technical specifications, it is an aim to technically and economically feasible order the use of the visor for pressure cookers in order to obtain safety certifications and meet the standards of quality to produce and market these products.

In addition, the developed solution dispense additional holes for positioning any metal fastener (such as rivets, washers, pins, screws, etc.). This very practical embodiment to couple the visor with a non-toxic elastomer avoids the problems resulting from expansion coming from the heating of the metal parts and the strong internal pressures of the pans. The proposed solution also dispenses the use of glues, adhesives and additional synthetic materials for sealing and positioning the visor, because these materials dry out easily due to the heat and may contain contaminants that would prevent to obtain the certifications for its use in contact with food.

BRIEF DESCRIPTION OF THE DRAWINGS

In order to the present solution be fully understood and put into practice by any technician in this area of technology, it will be described in a clear, concise and sufficient way, based on the accompanying drawings listed below.

DETAILED DESCRIPTION OF THE SEVERAL EMBODIMENTS

This utility model proposes as a solution a coupling system for a visor for a pressure cooker that can be easily removed by the user presenting the advantage of using a reduced number of components. In summary, the developed solution basically comprises an elastomer material sleeve (5) and a part of flat glass (2).

Figure 1:
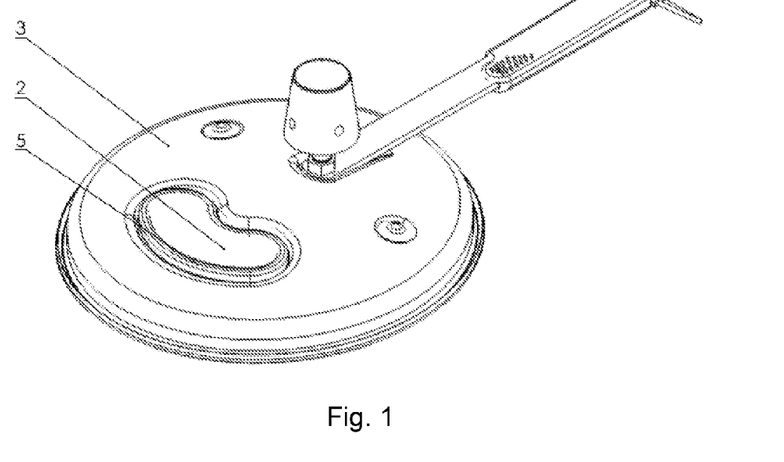
FIG. 1 shows the lid of the pressure cooker provided with a visor from an upper view.
Figure 2:
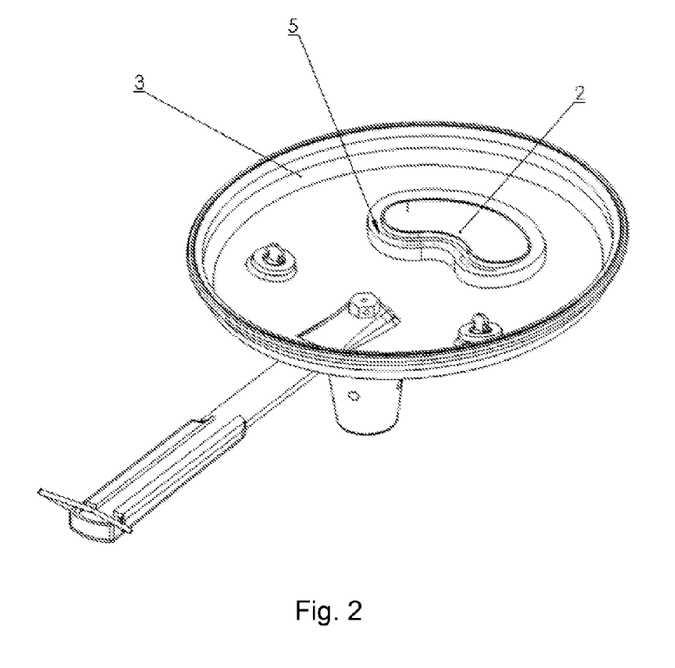
FIG. 2 shows the lid of the pressure cooker provided with a visor from a bottom view.
Figure 3:
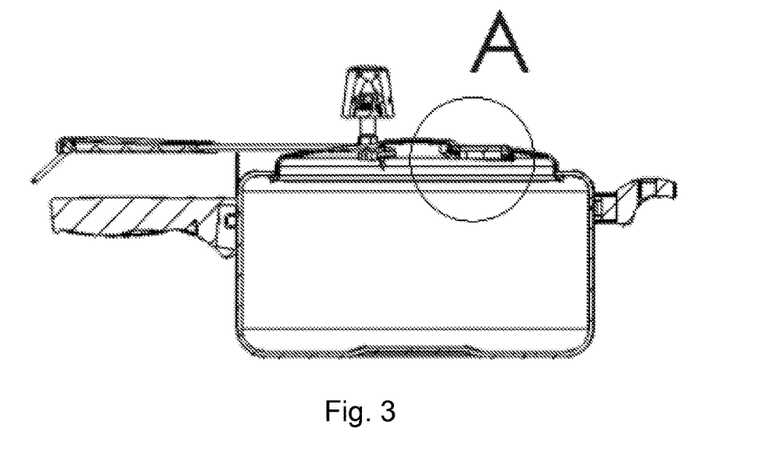
FIG. 3 shows a pressure cooker, in a cross sectional view, provided with a visor.
Figure 4:
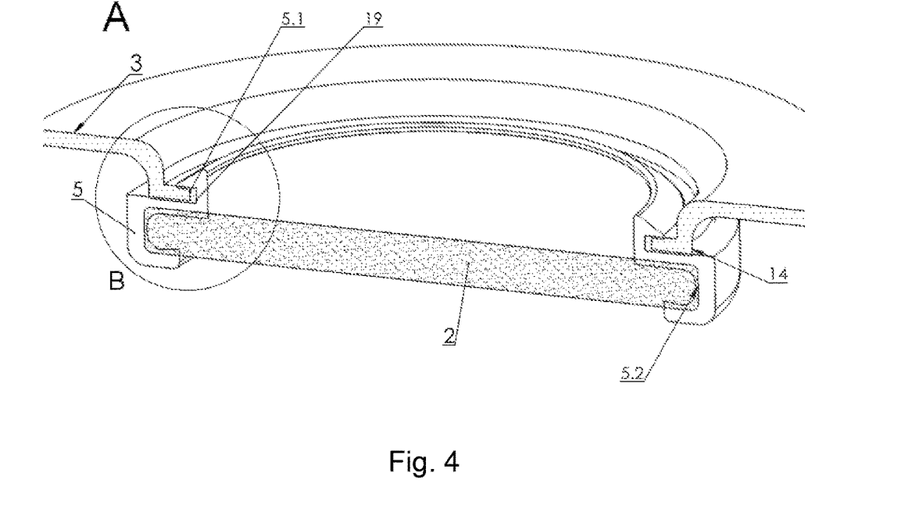
FIG. 4 shows the detail A, in enlarged scale, of the visor of the lids pan in a cross sectional view.
Figure 5:
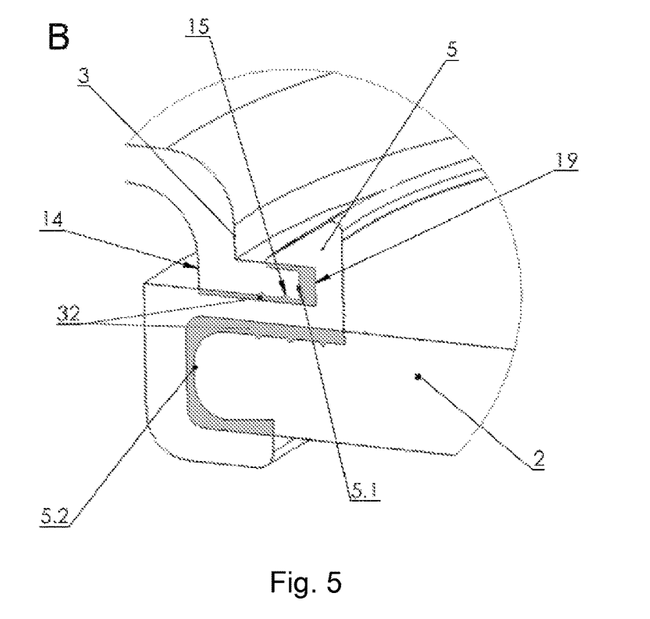
FIG. 5 shows the detail B, in enlarged scale, of the coupling of the visor of the lids pan in a cross sectional view.
Figure 6:
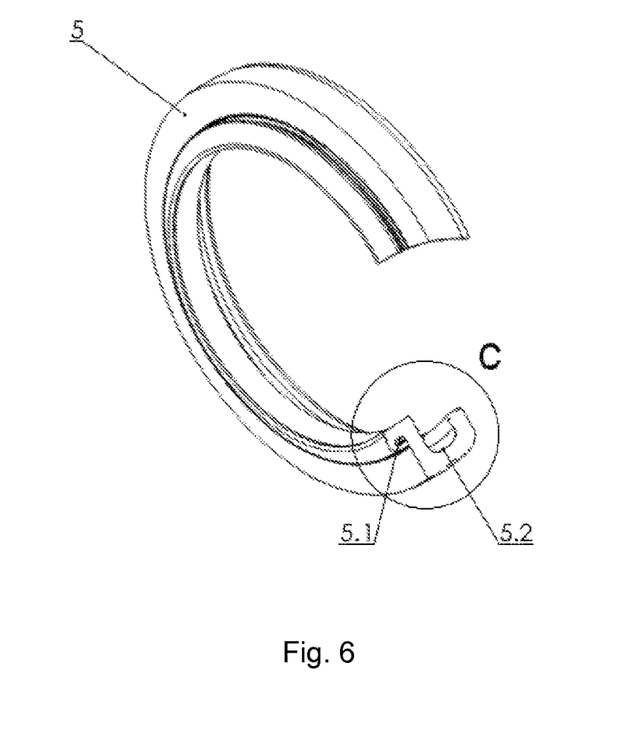
FIG. 6 shows the elastomer material sleeve in detail.

Both materials are relatively inexpensive and entirely viable in terms of costs and productivity. Moreover, since the elastomer material sleeve (5) and the part of flat glass (2) are simply coupled in the cover (3), the additional labor cost in the composition of the lid is almost irrelevant. The elastomer material sleeve (5) is designed to seal and prevent any possibility of leakage, escape and/or loss of pressure and is provided with at least one cavity (5.1) to which it is coupled centrally with the opening (19) of the metal lid (3). Furthermore, to allow the correct and safe coupling of the visor, the sleeve cavity (5.1) shall be aligned with the edge of the opening (19).

Figure 7:
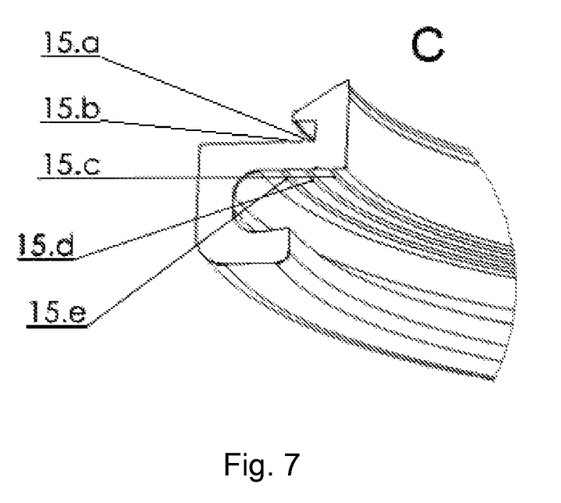
FIG. 7 shows the detail C, in enlarged scale, showing the contours of the elastomer material sleeve from a cross sectional bottom view.
Figure 8:
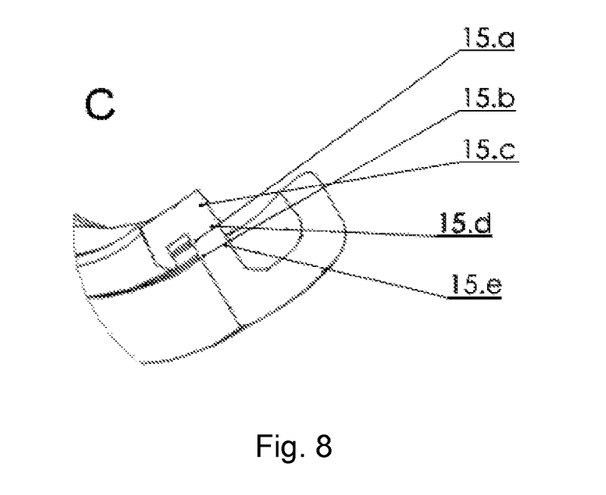
FIG. 8 shows the detail C, in enlarged scale, showing the contours of the elastomer material sleeve from a lateral cross sectional view.
Figure 9:
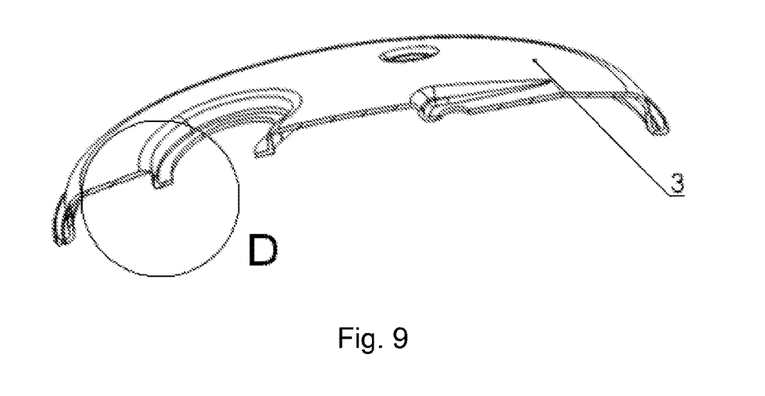
FIG. 9 shows the lid of the pressure cooker in side cross sectional view.
Figure 10:
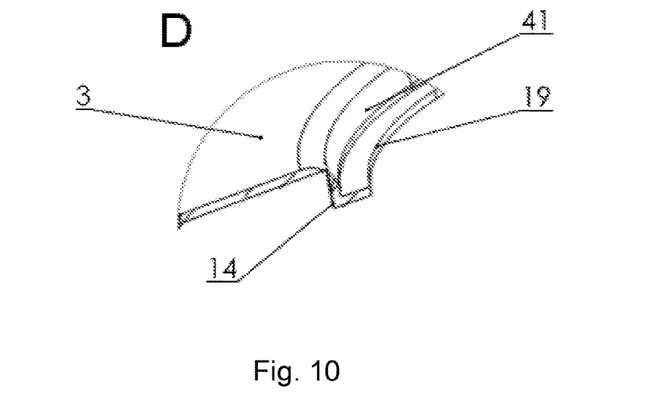
FIG. 10 shows the detail D, in enlarged scale, of the guiding assembly in cross sectional view.
Figure 11:
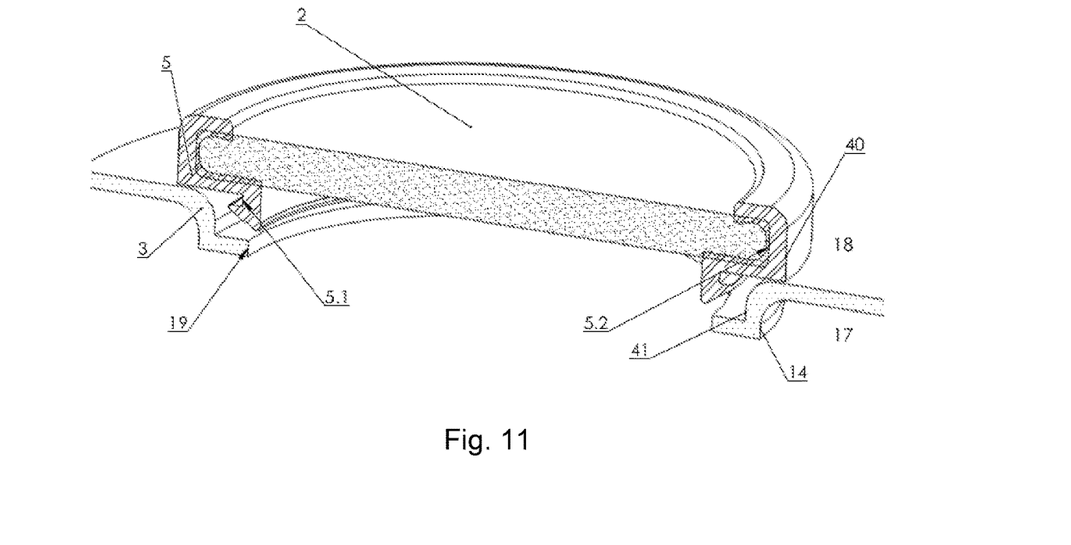
FIG. 11 shows the visor being wrongly coupled from the outside of the lid of the pressure cooker in cross sectional view.
Figure 12:
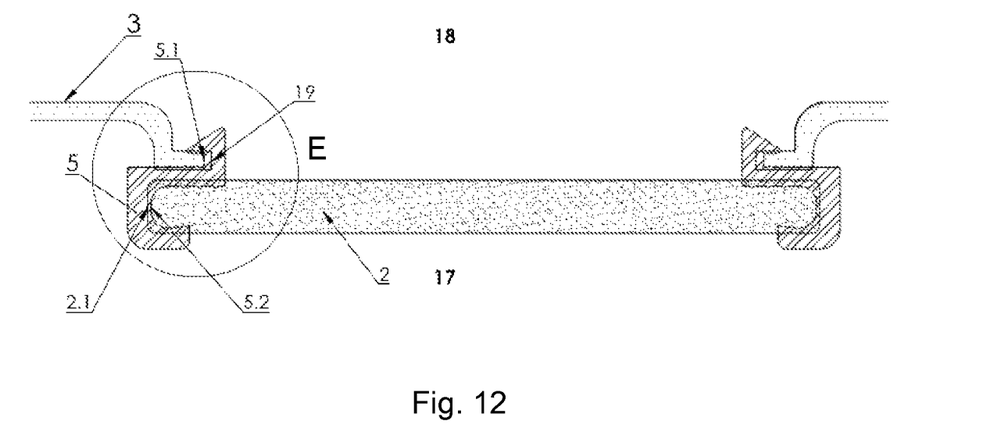
FIG. 12 shows the visor correctly coupled to the lid of the pressure cooker in a a cross sectional view.

The elastomer material sleeve (5) is the most important part in the coupling process of the visor in order to stop the internal pressure of the pressure cooker. For this are arranged along the inside of the sleeve (5) embossed micro sealing rings (15.a) (15.b) (15.c) (15.d) (15.e) positioned in the most critical points of possible emergence of pressure leakage/loss. These micro rings (15.a) (15.b) (15.c) (15.d) (15.e) are designed to increase the sealing efficiency from the beginning of the heating of the pan over the heat source. From the moment the heating is started, it is clear the importance of micro rings (15.a) (15.b) (15.c) (15.d) (15.e), since the internal pressure of the pan increases substantially from the inside (17) to the outside (18). Thus, because the regions of the micro rings (15.a) (15.b) (15.c) (15.d) (15.e) are smaller areas than the total contact area of the visor that receives and transfers the pressure, they become even more efficient to stop and seal any possible pressure, vapors or liquids leakage from the cooking process. That is, from the arrangement of the micro rings it is clear that specific critic spots are generated, in which there is a higher incidence of pressure and thereby higher efficiency of the sealing system.

Based on the implementation of visors with micro sealing rings in lids (3) of pressure cookers, despite all the forces are in action, there is no stress between the dilated material pressed and all the power is seized from the start of the process, while g faster and more uniform heating are obtained. Still, in the cavity (5.2) of the sleeve (5), the transparent glass (2) is positioned, remaining isolated, without contact and without friction with the metal parts of the pressure cooker.

The silicone sleeve (5) mounted with the round glass (2) is coupled into the inside of the pressure cooker lid, in a specific opening (19) that has a guiding assembly (14) which prevents the mounting of the visor on the outside part of the top of the lid. That is, due to the fact that the end (40) of the sleeve (5) is greater than the clearance (41) resulting from the lowering of the guiding assembly (14), the parts (5) (3) do not couple. Thus, the cavity (5.1) and the edge of the opening (19) do not align making impossible to couple the visor set from the outside (18) of the lid (3). More specifically, there is a lowering molding the desired shape of this lid, where is made the opening (19) so that if the visor is removed for any reason, its reassembly is only possible from the inside (17) of the cover (3). Thus, with the visor mounted on the inside of the cover, as the internal pressure of the pan increases, it also increase the sealing of the visor, as thus force will be exerted on the edge of the opening (19) of the lid (3).

Figure 13:
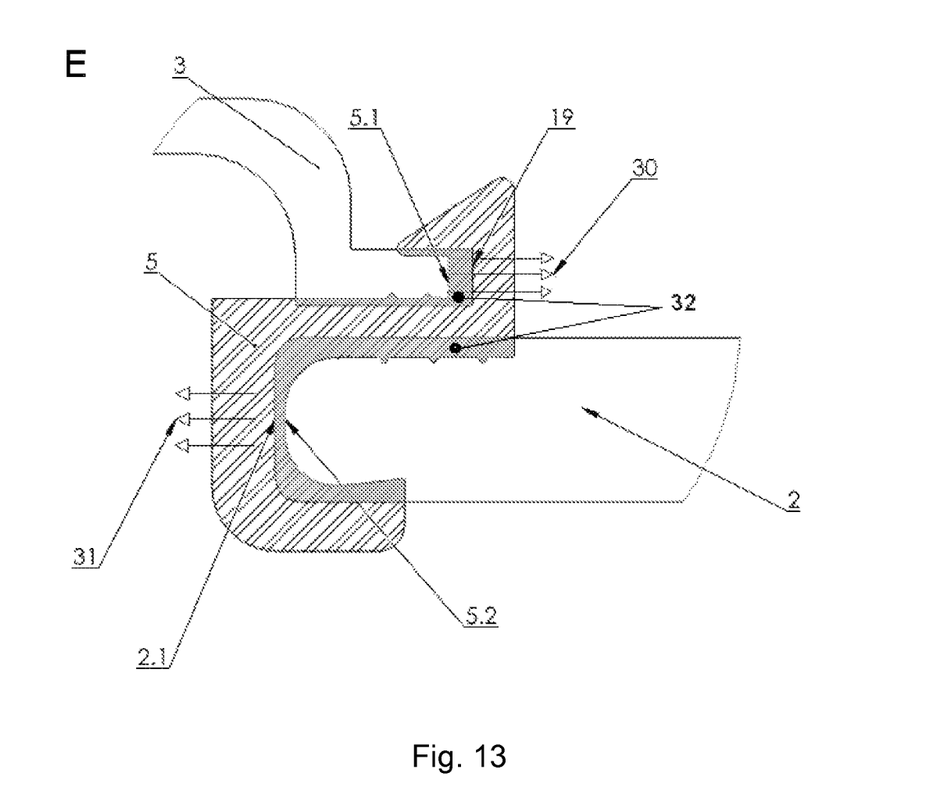
FIG. 13 shows the detail E, in enlarged scale, of the coupling of the visor with the lid of the pressure cooker.

In addition, in order to dispense the use of any fixing means (screws, washers, rivets, adhesives, glues, etc.) in the assembly of the set of the glass (2) and the sleeve (5) in the lid (3), the present invention provides the use of inverted pressure (30) (31) on the elastomer material sleeve (5). That is, for coupling the sleeve (5) with simplicity and convenience in the opening (19) of the lid (3), the inner diameter of the opening (19) is designed with a smaller diameter than the external diameter of the cavity (5.1). Thus, it is provided a sufficient hold for holding the region (30) to the center of the diameter of the sleeve (5). Meanwhile, the outer diameter (2.1) of the glass part (2) is designed larger than the inner diameter of the cavity (5.2) of the sleeve (5). Thus when the glass is placed in this larger cavity (5.2) the elastomer will be expanded (31), pressing the edge (2.1) of the glass, and will be pressing and sealing the areas (32) in contact with the glass, and conversely the sleeve (55) is being contracted (3) to position and seal it in the smaller cavity (5.1). Finally, the elastomer material sleeve (5), when compared the size of their cavities (5.1) (5.2) with respect to the dimensions of the thicknesses of the lid (3) and the glass (2), has griping areas (32). These grips are designed to ensure perfect sealing of the internal pressure of the pan while ensuring the correct positioning of these parts when in use and under any pressure.

It has to be emphasized that the pictures and description made herein do not have the power to limit the embodiments of the inventive concept proposed, but rather to illustrate and make understandable the conceptual innovations disclosed herein, so that the descriptions and images should be interpreted in an illustrative and exemplary manner, but not exhaustive, and there may be other equivalent or similar forms of implementation of the inventive concept disclosed herein and that are not from the protection range of the invention. In summary, the visor format is not subject to limitation of the protection of this patent application. Thus, there may be many different shapes (circular, elliptical, etc.). Visors can still be found in the bodies and lids of traditional and electrical pressure cookers, for domestic and industrial use without departing from the inventive concept proposed.

The present specification is related to an improvement in the coupling system of a removable visor for a pressure cooker, with novelty, inventive step and industrial application and therefore covered by all the essential requirements for the granting of the claimed utility model.

What is claimed is:

1. A coupling system for a removable visor configured for use with a pressure cooker with an elastomer material sleeve (5) and a transparent glass (2) to be attached to the lid (3) of the pressure cooker wherein the elastomer material sleeve (5) possesses two cavities (5.1) (5.2), a first cavity (5.1) smaller than a second cavity (5.2), the first cavity (5.1) connected to an opening (19) of the lid (3) that includes a lowered molding forming a clearance (41) that is wider than where the opening is made and a guiding assembly (14), and the second cavity (5.2) connected to an edge (2.1) of the transparent glass (2), wherein an outer diameter of the edge (2.1) of transparent glass (2) is larger than an inner diameter of the second cavity (5.2) of the sleeve (5);

wherein the insertion of the transparent glass (2) into the second cavity (5.2) of the sleeves (5) expands the elastomer of the second cavity (5.2) by an inverted pressure (31) pressing and sealing the edge (2.1) of the transparent glass (2) to a gripping area (32) of the second cavity (5.2); said inverted pressure (31) conversely contracting the sleeve by an inverted pressure (30) pressing and sealing the gripping area (32) of the first cavity (5.1) against the opening (19) of the lid (3);

wherein the first cavity (5.1) includes a pair of micro sealing rings (15.a) (15.b) and the second cavity includes three micro sealing rings (15.c) (15.d) (15.e);

wherein an end (40) of the sleeve (5) is greater than a clearance (41) resulting from the lowering of the guiding assembly (14) as the sleeve (5) and the lid (3) do not couple; and wherein the cavity (5.1) and the edge of the opening (19) do not align thereby making it impossible to couple the visor from an outside (18) of the lid (3).

2. The coupling system for a removable visor configured for use with a pressure cooker as claimed in claim 1, wherein the elastomer material sleeve (5) is mounted with the transparent glass (2) and is coupled to the inside of the lid (3), in the opening (19) of the lid (3).

3. The coupling system for a removable visor configured for use with a pressure cooker as claimed in claim 1, wherein the first cavity (5.1) of the elastomer material sleeve (5) is aligned with the edge of the opening (19) of the lid (3).

4. The coupling system for a removable visor configured for use with a pressure cooker as claimed in claim 1, wherein an end of the elastomer material sleeve (5) is greater than a clearance (41) resulting from the lowering of a guiding assembly (14), thereby preventing coupling of the elastomer material sleeve (5) with the lid (3).

5. The coupling system for a removable visor configured for use with a pressure cooker as claimed in claim 1, wherein a regions of the micro rings (15.a-15.e) are smaller in area than a total contact area of the removable visor thereby enabling a more efficient sealing of any pressure.

6. The coupling system for a removable visor configured for use with a pressure cooker as claimed in claim 1, wherein the elastomer material sleeve (5) is coupled into the inside of the lid (3) in a specific opening (19) that includes a guiding assembly (14) to prevent the mounting of the removable visor on an outside part of a top of the lid (3).

7. The coupling system for a removable visor configured for use with a pressure cooker as claimed in claim 6, wherein an inner diameter of the specific opening (19) possesses a smaller diameter than an external diameter of the first cavity (5.1).

* * * * *